(12) United States Patent
MacArthur et al.

(10) Patent No.: US 9,242,358 B2
(45) Date of Patent: Jan. 26, 2016

(54) LOOPED PIN INSTALLATION APPARATUS

(75) Inventors: Benjamin B. MacArthur, Barrie (CA); Dennis Breedon, Loretto (CA)

(73) Assignee: Honda Motor Co., Ltd., Tokyo (JP)

( * ) Notice: Subject to any disclaimer, the term of this patent is extended or adjusted under 35 U.S.C. 154(b) by 997 days.

(21) Appl. No.: 13/370,262

(22) Filed: Feb. 9, 2012

(65) Prior Publication Data

US 2013/0205557 A1  Aug. 15, 2013

(51) Int. Cl.
*B25B 27/14* (2006.01)
*B25B 27/08* (2006.01)
*B25J 15/06* (2006.01)
*B25B 31/00* (2006.01)

(52) U.S. Cl.
CPC .............. *B25B 27/08* (2013.01); *B25B 31/00* (2013.01); *B25J 15/0616* (2013.01); *Y10T 29/53943* (2015.01)

(58) Field of Classification Search
USPC ............................................. 29/278
See application file for complete search history.

(56) References Cited

U.S. PATENT DOCUMENTS

| | | | | |
|---|---|---|---|---|
| 2,266,689 A * | 12/1941 | Lemison | ................. | 411/514 |
| 3,039,343 A | 6/1962 | Richards | | |
| 3,157,082 A | 11/1964 | Thompson | | |
| 3,579,795 A * | 5/1971 | Burman | ................. | 29/252 |
| 3,903,577 A * | 9/1975 | Phillips | ................. | 29/764 |
| 4,009,625 A | 3/1977 | Pfaff | | |
| 4,050,148 A * | 9/1977 | Hastings | ................. | 29/764 |
| 4,052,788 A * | 10/1977 | Hastings et al. | ................. | 29/764 |
| 4,184,241 A * | 1/1980 | Gunther et al. | ................. | 29/278 |
| 4,277,872 A * | 7/1981 | Lewis | ................. | 29/229 |
| 4,298,299 A * | 11/1981 | Quarles | ................. | 411/514 |
| 4,501,054 A * | 2/1985 | Morgan | ................. | 29/235 |
| 4,586,229 A * | 5/1986 | Pendola | ................. | 29/252 |
| 4,607,553 A | 8/1986 | Hartzell | | |
| 5,050,286 A * | 9/1991 | Miyanaga | ................. | 29/275 |
| 5,058,264 A * | 10/1991 | Quach | ................. | 29/741 |
| 5,194,108 A * | 3/1993 | White et al. | ................. | 156/71 |
| 5,339,506 A * | 8/1994 | Nusz | ................. | 29/252 |
| 5,388,943 A * | 2/1995 | Nadherny | ................. | 411/513 |
| 5,553,373 A * | 9/1996 | Sprayberry | ................. | 29/758 |
| 5,624,342 A * | 4/1997 | Younger | ................. | 475/127 |
| 6,135,692 A * | 10/2000 | Lary | ................. | 411/530 |
| 6,135,693 A * | 10/2000 | Leitzke et al. | ................. | 411/530 |
| 6,148,493 A * | 11/2000 | Pixley et al. | ................. | 29/275 |
| 6,223,408 B1 * | 5/2001 | Vetter et al. | ................. | 29/235 |
| 6,330,737 B1 * | 12/2001 | Lowemark | ................. | 29/214 |
| 6,968,763 B2 | 11/2005 | Chapin et al. | | |
| 7,210,384 B2 | 5/2007 | Elynuik | | |
| 7,496,999 B2 * | 3/2009 | Robarge | ................. | 29/265 |
| 7,725,997 B2 * | 6/2010 | Reed et al. | ................. | 29/278 |
| 7,980,235 B1 * | 7/2011 | Kronengold et al. | ................. | 124/1 |
| 8,006,361 B2 * | 8/2011 | Hutter et al. | ................. | 29/243.518 |

(Continued)

FOREIGN PATENT DOCUMENTS

JP         6218449         8/1994

*Primary Examiner* — Lee D Wilson
*Assistant Examiner* — Alvin Grant
(74) *Attorney, Agent, or Firm* — Standley Law Group LLP

(57) ABSTRACT

Embodiments of the invention are directed to an apparatus for installing a looped pin in an associated bracket. An exemplary apparatus generally comprises a body having a pin-receiving slot formed therein for receiving a closed end of the pin therein, and a resiliently-biased pin-retaining mechanism within the slot for releasably engaging and retaining the closed end portion within the pin-receiving slot during installation.

14 Claims, 9 Drawing Sheets

(56) References Cited

U.S. PATENT DOCUMENTS

| | | | |
|---|---|---|---|
| 8,434,206 B2 * | 5/2013 | Yu | 29/283 |
| 2007/0157446 A1 * | 7/2007 | Kothke | 29/278 |
| 2008/0068732 A1 * | 3/2008 | Chiu et al. | 359/809 |
| 2013/0205557 A1 * | 8/2013 | MacArthur et al. | 29/278 |
| 2013/0227823 A1 * | 9/2013 | Diop et al. | 24/135 R |

* cited by examiner

LOOPED PIN INSTALLATION APPARATUS

CROSS-REFERENCE TO RELATED APPLICATIONS

As authorized by 35 U.S.C. §119, this application claims priority to and hereby incorporates by reference Canadian Application Serial No. CA 2767505 A, titled LOOPED PIN INSTALLATION APPARATUS, filed on Feb. 9, 2012.

TECHNICAL FIELD

The present disclosure relates generally to methods and apparatus for installation of pins and clips, and in particular, to a looped pin installation apparatus.

BACKGROUND

Looped pins are generally known in the art to consist of a generally elongated structure having an open end and one or more loops shaped for cooperative engagement with a corresponding structure or the like for the purpose of fastening, restraining and/or retaining elements in a particular position, orientation and/or configuration, for example. Transmission pins provide one example of such pins, and are generally known in the art to consist of an elongated looped structure having opposed closed and open ends for engaging a transmission bracket. Other pins and clips such as cotter pins, safety clips, etc. of generally similar structure and function are also known in the art. In general, the pin or clip is installed by grasping the closed end, either by the hand or with a tool, and engaging the open end with an associated bracket, shaft, post or the like.

Various tools have been developed to facilitate installation of clip-like or pin-like structures on a corresponding bracket, such as described in US Patent Application Publication No. 2009/0278334 to Carr et al., U.S. Pat. No. 5,557,832 to Brook, and U.S. Pat. No. 4,277,872 to Lewis. In the tools known in the art, such as the ones listed above, the pin or clip is generally retained in the tool, in a groove or slot or between two planar blades, and held by friction or by means of a magnetic force. The tool is then used to insert the pin in the associated bracket and then drawn away from the bracket to effect release of the pin from the tool.

As will be appreciated by the skilled artisan, the above and other such techniques suffer from various drawbacks. For example, frictional wear and tear may render the tool unusable after a period of time. Furthermore, partial, improper or incorrectly installed pins can also be a problem. For instance, partially or improperly installed pins can be hard to detect and can disengage from the associated brackets during use. Therefore, there remains a need for a looped pin installation apparatus that overcome some of the drawbacks of known apparatus, or at least, provides the public with a useful alternative.

This background information is provided to reveal information believed by the applicant to be of possible relevance to the present invention. No admission is necessarily intended, nor should be construed, that any of the preceding information constitutes prior art against the present invention.

SUMMARY

An object of the invention is to provide a looped pin installation apparatus that overcomes some of the drawbacks of known apparatus, or at least, provides the public with a useful alternative.

In accordance with one embodiment of the invention, there is provided an apparatus for installing a pin with loop-like structure and opposed open and closed end portions in an associated bracket, the apparatus comprising: a body having a pin-receiving slot formed therein for receiving the pin, the pin-receiving slot shaped and sized for longitudinal motion of the closed end portion therein with the open end portion extending outwardly therefrom; and a resiliently-biased pin-retaining mechanism transversely extending within the pin-receiving slot for releasably engaging and retaining the closed end portion within the pin-receiving slot during installation; wherein, upon engagement of the open end portion with the associated bracket, retraction of the apparatus releases engagement of the closed end portion with the pin-retaining mechanism.

In accordance with another embodiment of the invention, there is provided an apparatus for installing a pin having opposed looped and locking end portions in an associated bracket, the apparatus comprising: a body having a pin-receiving slot formed therein for receiving the looped end of the pin therein; and a resiliently-biased pin-retaining mechanism within the pin-receiving slot for releasably engaging and retaining the looped end portion within the pin-receiving slot during installation; wherein a resiliency of said pin-retaining mechanism is preselected so to release the looped end of the pin upon retraction of the apparatus once the pin has engaged the associated bracket, only upon the pin lockingly engaging the associated bracket.

Other aims, objects, advantages and features of the invention will become more apparent upon reading of the following non-restrictive description of specific embodiments thereof, given by way of example only with reference to the accompanying drawings.

BRIEF DESCRIPTION OF THE DRAWINGS

Several embodiments of the present disclosure will be provided, by way of examples only, with reference to the appended drawings, wherein.

DETAILED DESCRIPTION OF EXEMPLARY EMBODIMENT(S)

With reference to the disclosure herein and the appended figures, a looped pin installation apparatus will now be described, in accordance with different embodiments of the invention.

Figure 1:
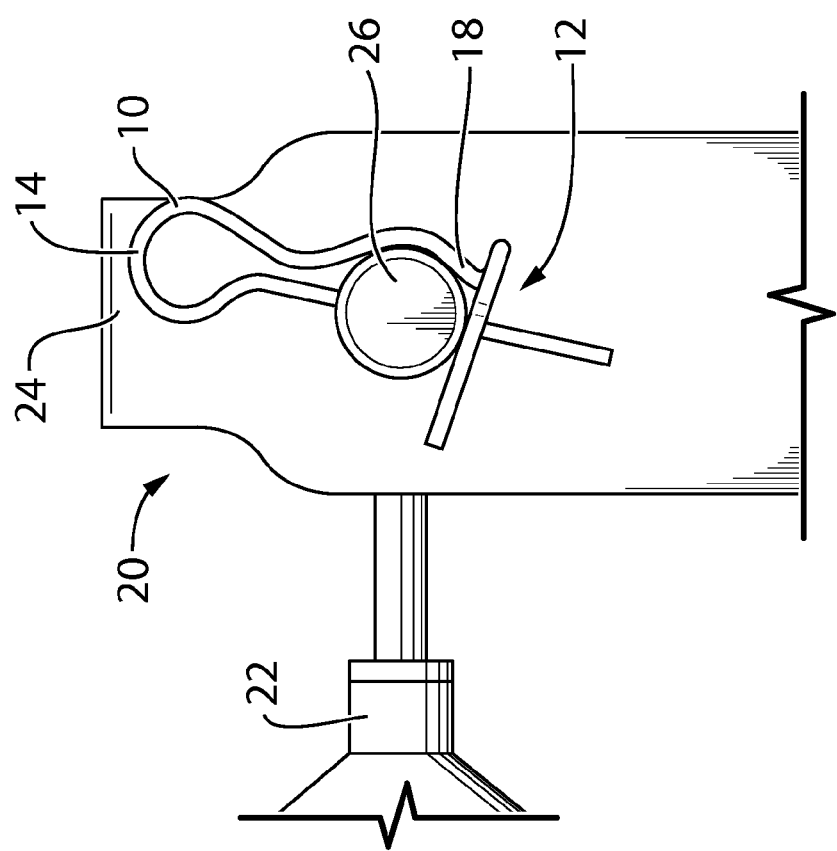
FIG. 1 is a front elevation view of a transmission pin installed in an associated transmission bracket.

With reference to the FIG. 1, and in accordance with one embodiment of the invention, the apparatus described herein provide for the installation of a looped pin in an associated bracket, such as for example, installation of a transmission pin 10 in an associated transmission bracket 20. In this particular example, the transmission pin 10 is shaped to secure a transmission wire 22 to a selector arm 24 in an automatic transmission (not shown). Namely, the transmission wire 22 is operatively coupled to the selector arm 24 via a coupling pin 26 inserted through corresponding holes in the selector arm 24 and a transmission wire coupler (not explicitly shown), which coupling pin 26 is then secured in position via installation of the transmission pin 10, itself inserted through a corresponding hole (not explicitly shown) extending across the tip of coupling pin 26 along its diameter. As will be appreciated by the skilled artisan, this assembly allows the automatic transmission to engage the transmission and thereby enable changing of gears.

As seen in FIG. 1, the transmission pin 10 generally has an elongated loop-like or looped structure having an open end 12 for engaging an associated bracket, in this example the coupling pin 26, and a closed end 14 longitudinally opposite to the open end 12. For instance, in this example, the open end 12 of the transmission pin 10 can be urged around and thus resiliently engage the tip of the coupling pin 26 to secure its position in the assembly. When properly installed, a longitudinal element 16 of the pin's open end 12 extends through the hole at the tip of the coupling pin 26, while a locking element 18 is shaped to curve along and thus partially engage a circumference of the coupling pin 26, and then bend over and across the longitudinal element 16 to further transversally engage the pin 26, thus locking the transmission pin 10 in place.

Incorrectly or incompletely installed pins, such as transmission pin 10, can be difficult to detect in the factory and vibrations such as those created during driving can cause these incorrectly installed pins to fall out of the bracket. The installation apparatus described herein facilitates installation of a pin, such as transmission pin 10, in an associated bracket, while additionally providing a check of the installation. The installation apparatus and method of installation are reliable, robust and allow for repeated use.

Illustrative embodiments of the pin installation tool or apparatus will now be described in the context of the installation of a transmission pin to an associated transmission bracket, as introduced above. The skilled worker will however readily understand that these illustrative embodiments are intended as exemplary only, and that the apparatus described herein can be readily applied for the installation of similar looped pins or clips in other contexts.

Figure 2:
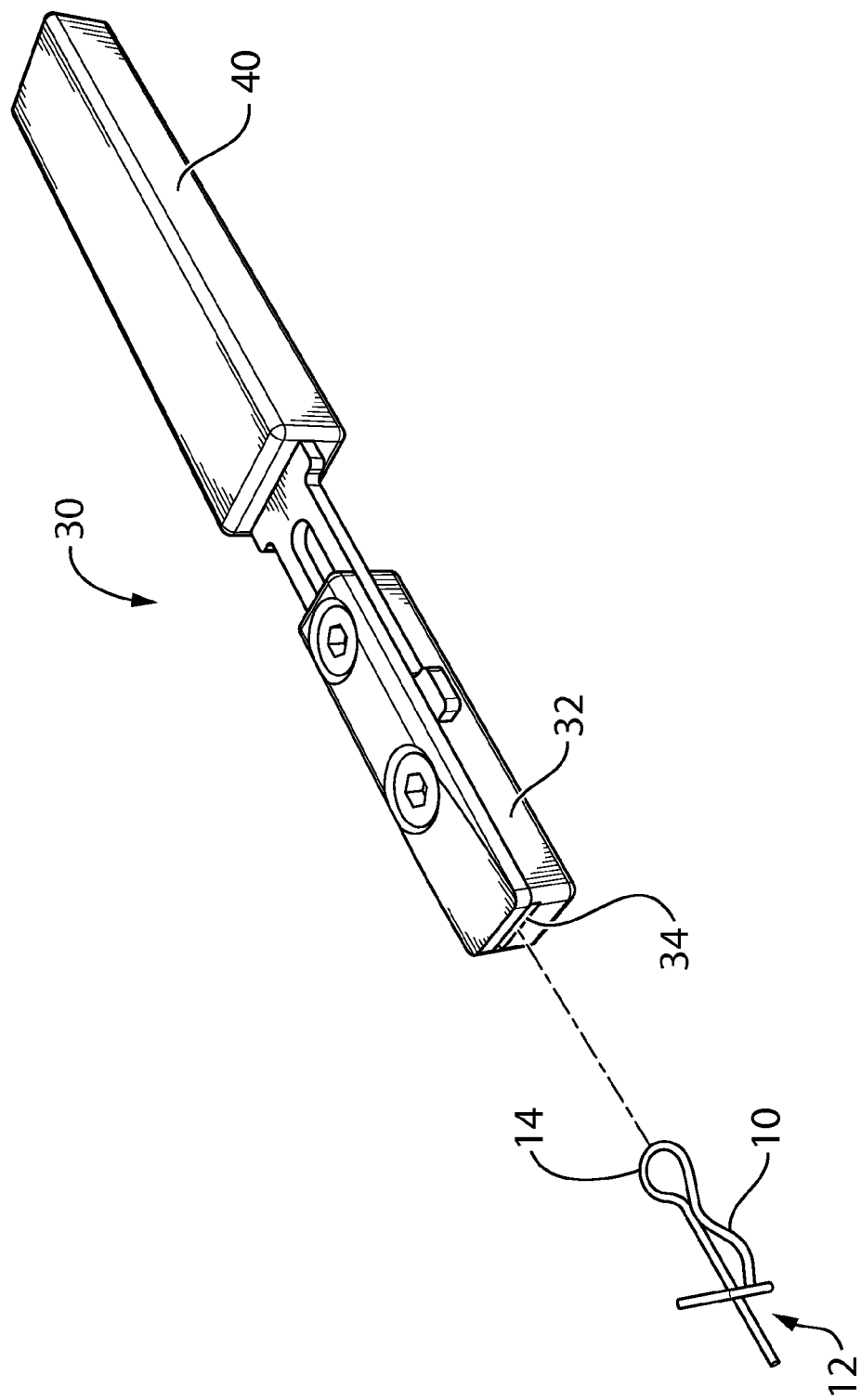
FIG. 2 is a perspective view of a transmission pin and an apparatus for installing the transmission pin in an associated bracket, in accordance with one embodiment of the invention, showing alignment of the pin for insertion into the apparatus.

With reference to FIG. 2, and in accordance with one embodiment of the invention, an apparatus 30 (e.g. tool or jig) for installing a looped pin, such as transmission pin 10, to an associated bracket (such as bracket 20 of FIG. 1) will now be described. The apparatus 30 generally comprises an installation head 32 having a pin-receiving slot 34 longitudinally formed therein for receiving the closed end portion 14 of the pin 10 when inserted therein. The apparatus further comprises a handle 40 to which is secured installation head 32 in providing greater reach and thus facilitating manipulation of the apparatus 30 during installation of the pin 10 to its associated bracket.

Figure 3:
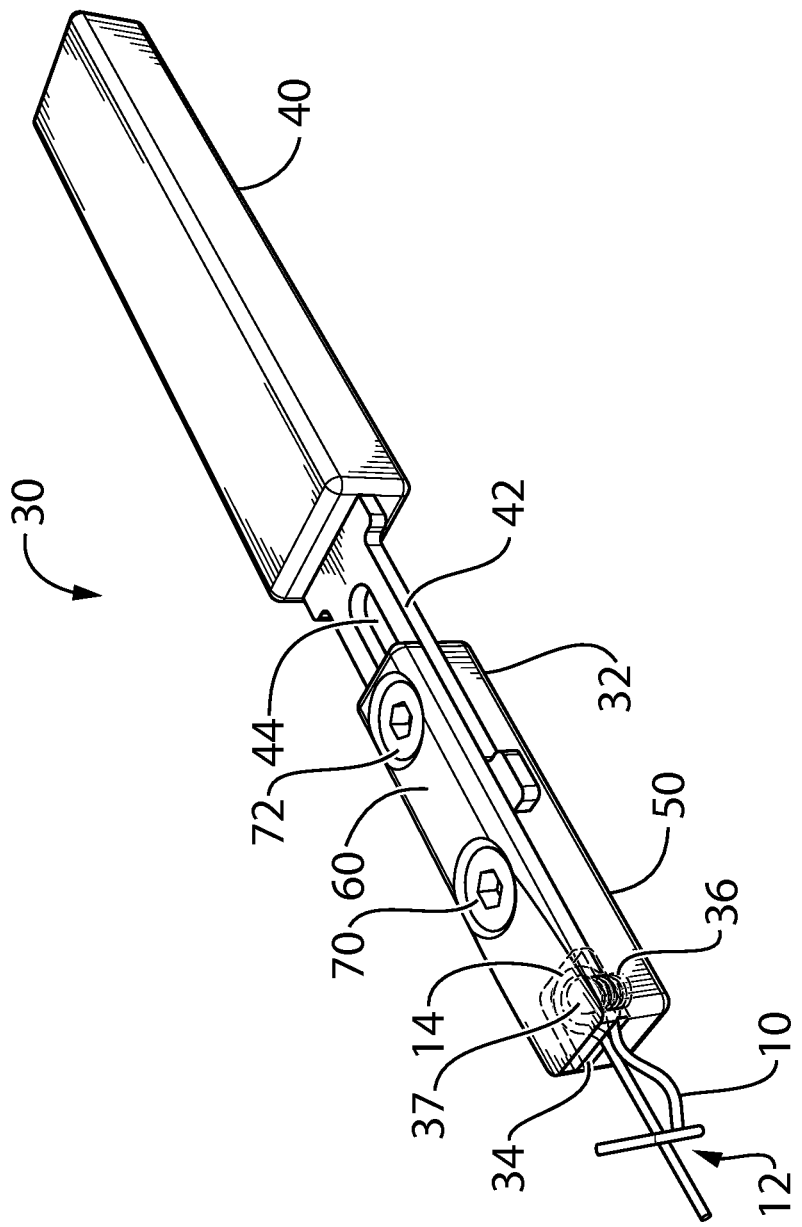
FIG. 3 is a perspective view of the transmission pin inserted into the apparatus of FIG. 2, showing in phantom lines a pin-retaining mechanism of the apparatus, in accordance with one embodiment of the invention.
Figure 4A:
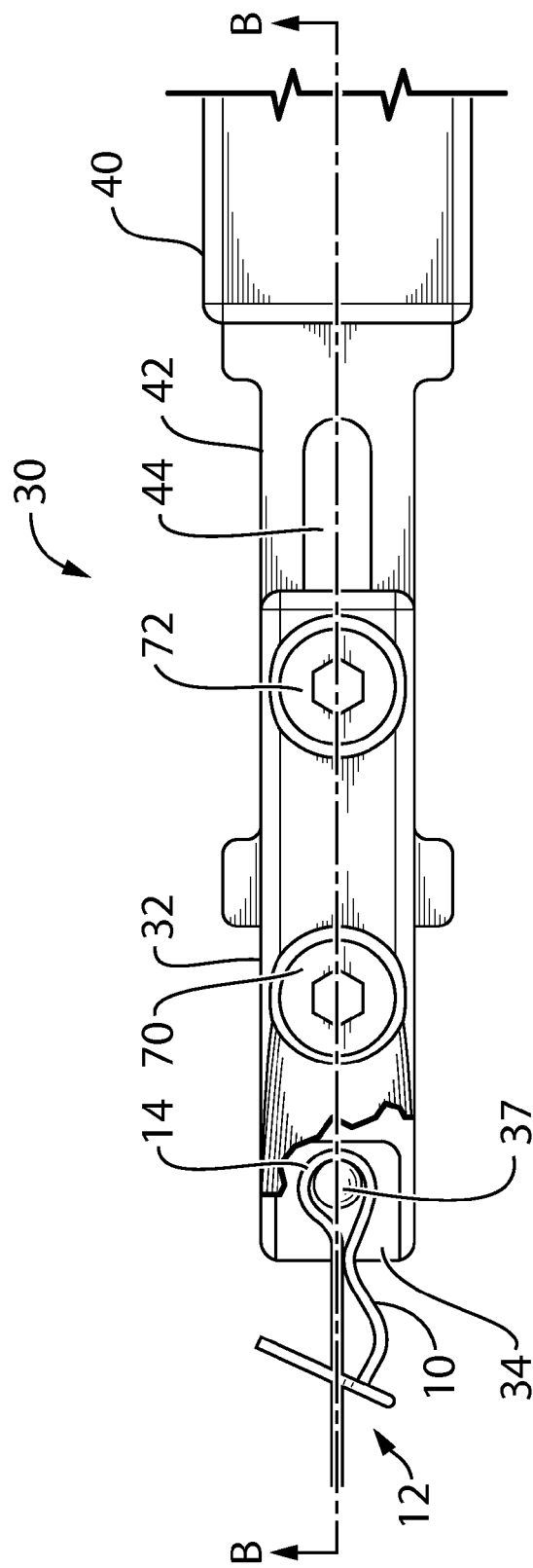
FIG. 4A is a top plan view of the apparatus of FIG. 3 partially cut away to show the pin retained therein by the pin-retaining mechanism.
Figure 4B:
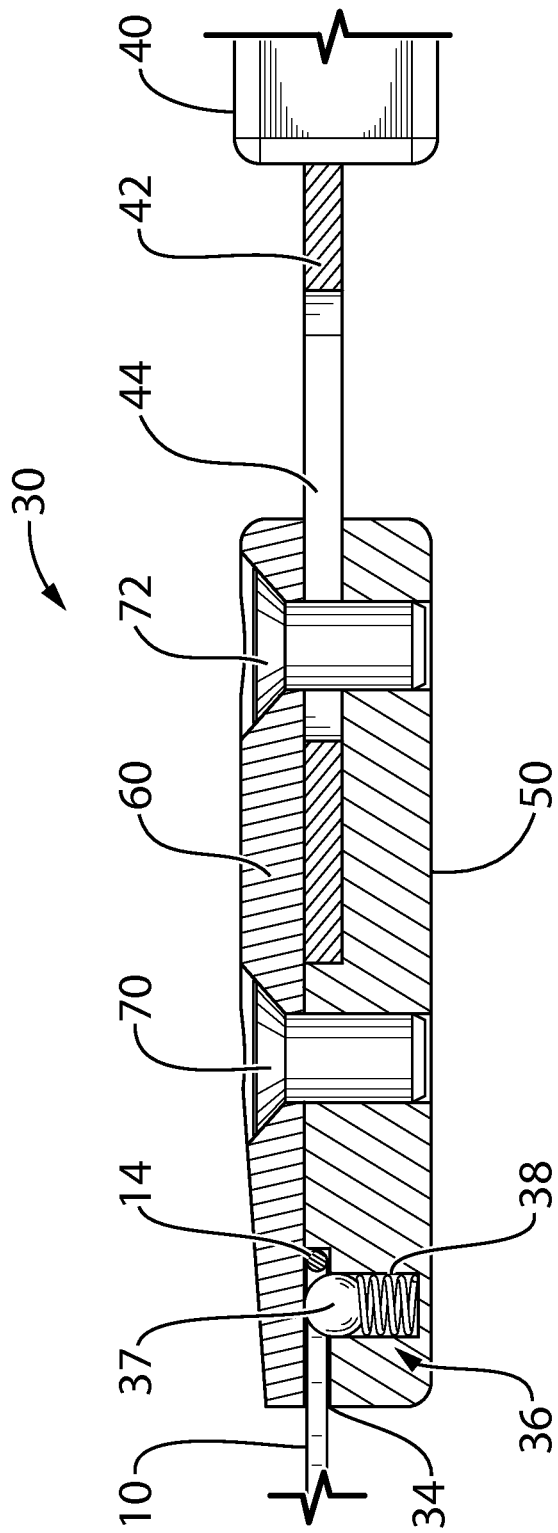
FIG. 4B is a cross-sectional view of the apparatus of FIG. 4A taken along line B-B thereof.

FIGS. 3, 4A and 4B show the pin 10 once inserted longitudinally into the slot 34 of the apparatus 30. As shown in these Figures, the slot 34 is generally shaped and sized to receive and retain the closed end portion 14 of the pin 10 with the open end portion 12 extending outwardly therefrom. In this particular embodiment, the slot 34 is generally rectangular in shape thus allowing for the longitudinal displacement of the pin 10 into and out of the slot 34 while substantially restricting transverse motion. For example, in the embodiment shown, the slot 34 is adapted to the pin dimensions, having a slot height and slot width that substantially matches a thickness and width respectively of the pin's closed end portion 14. A longitudinal extent of the slot 34 is defined so to limit a longitudinal insertion depth for the pin 10, such that open end 12 extends sufficiently outwardly from slot 34 when the pin 10 is installed therein to facilitate installation of pin 10 to an associated bracket.

The installation head 32 further comprises a resiliently-biased pin-retaining mechanism 36 transversely extending within the pin-receiving slot 34 for releasably engaging and retaining the closed end portion 14 of the pin 10 within the pin-receiving slot 34 during installation. In this embodiment, the pin-retaining mechanism 36 consists of a spring-loaded ball bearing 37 biased to retractably extend into the slot 34 from a cylindrical cavity 38 formed through a bottom surface thereof (in the depicted orientation) that extends within a first structure 50 of the installation head 32. The spring bias of the ball bearing 37 is selected such that the bearing 37 can be retracted by the application of a sufficient force exerted thereupon, for example, by the closed end 14 of the pin 10 when pushing or pulling with sufficient force on the pin 10 along a longitudinal axis of the slot. Accordingly, in the absence of a sufficient pulling force, the ball bearing bias will be sufficient to obstruct extraction of the pin 10 from slot 34, thus securing the closed end 14 in place until such sufficient force is provided. In one embodiment, a resiliency of the pin-retaining mechanism is selected so to release the closed or looped end of the pin upon retraction of the apparatus once the pin has engaged the associated bracket, only upon the pin lockingly engaging the associated bracket.

Figure 5:
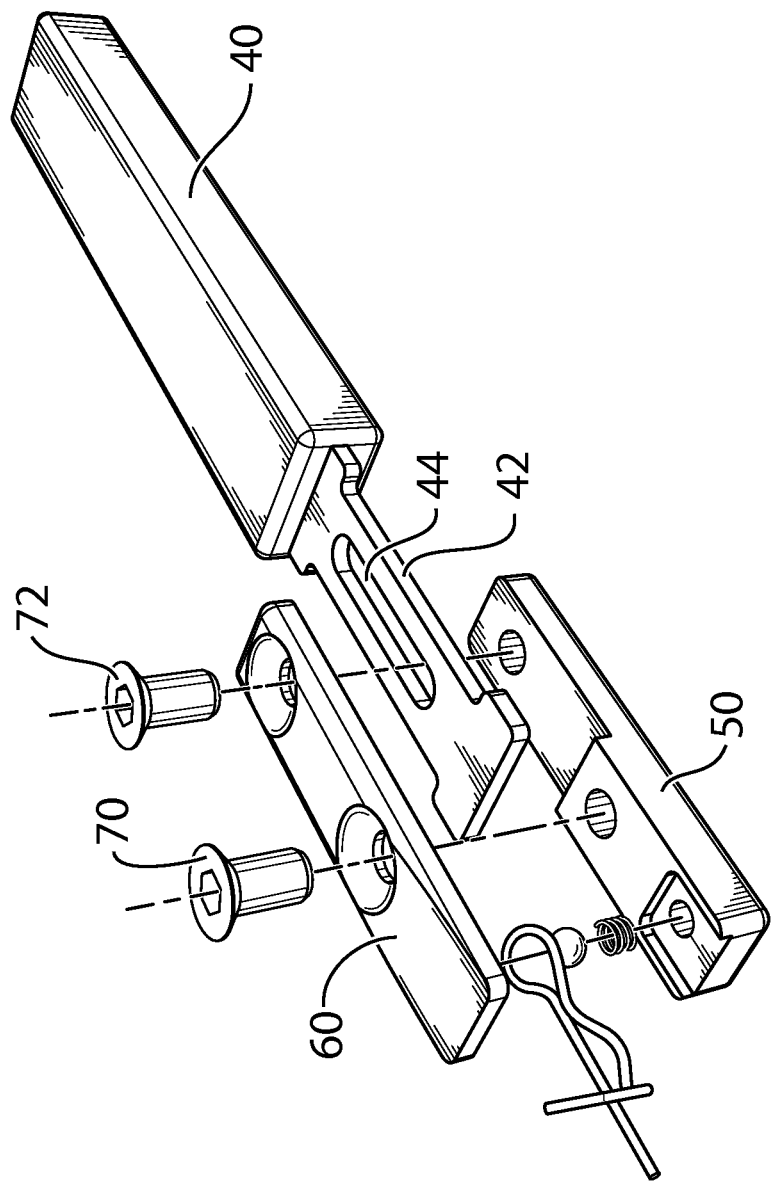
FIG. 5 is an exploded perspective view of the apparatus of FIG. 3.
Figure 6A:
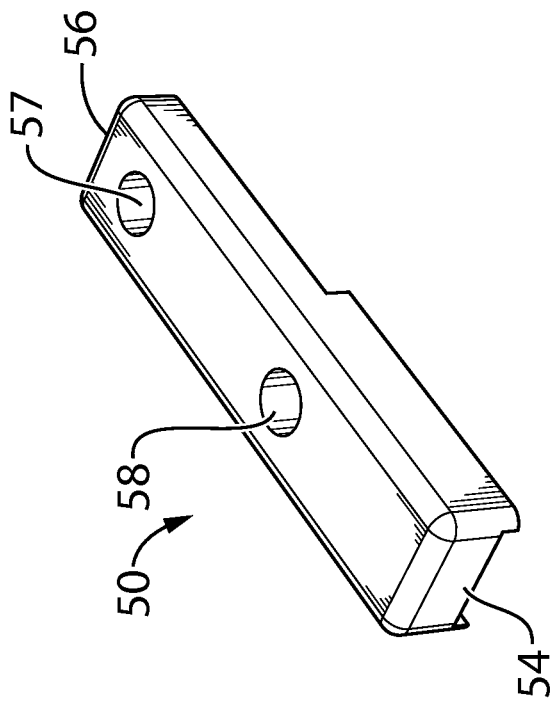
FIGS. 6A and 6B are respective top and bottom perspective views of a first installation head structure of the apparatus of FIG. 3.
Figure 6B:
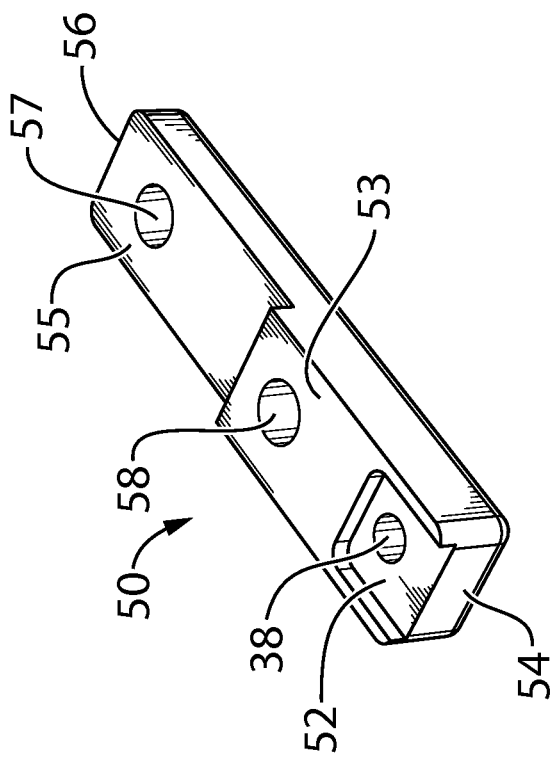
Figure 7B:
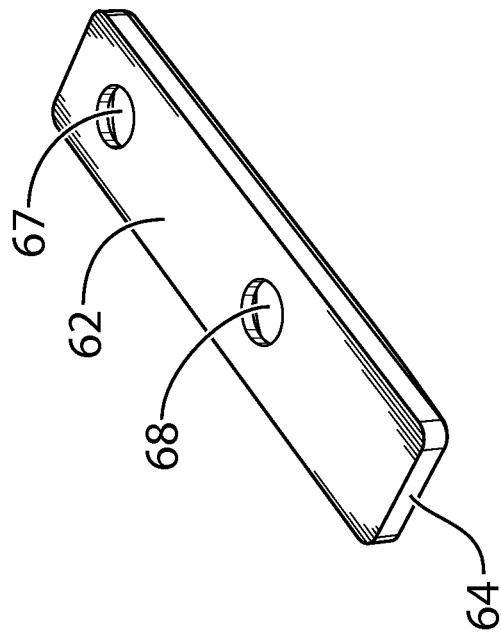
FIGS. 7A and 7B are respective top and bottom perspective views of a second installation head structure of the apparatus of FIG. 3.
Figure 7A:
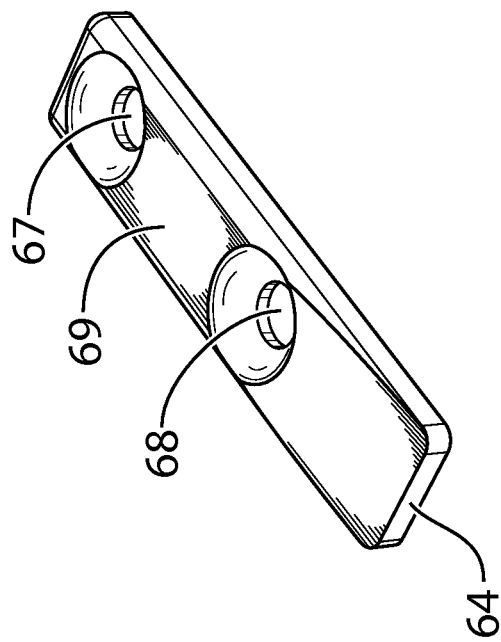

With added reference to FIG. 5, the installation head 32 is generally comprised of a first structure 50 and a second structure 60, hereinafter referred to as bottom and top structures, respectively, given the depicted orientation of the apparatus 30 in these Figures. The top and bottom structures are generally secured to one another via fasteners 70 and 72 on either side of a slotted neck portion 42 of the handle 40, such that a longitudinal positioning of the installation head 32 may be adjusted upon adjusting a longitudinal engagement location of fastener 72 within slot 44 of neck portion 42.

With reference to FIGS. 4B, 6A, 6B, 7A and 7B, the bottom installation head structure 50 comprises a substantially rectangular slot-defining recess 52 extending downwardly from a first upper surface 53 at a pin-receiving end portion 54 thereof, at the bottom of which the cylindrical cavity 38 is defined for receiving the spring-loaded ball bearing 37. A second upper surface 55 at a handle end portion 56 of the bottom structure 50 is stepped down from the first upper surface 53 for receiving the handle neck portion 42 thereon such that a depth of this step is substantially equal to a thickness of the neck portion 42. A pair of threaded fastening holes 57 and 58 is also provided for engagement by fasteners 72 and 70, respectively, in securing the bottom structure 50 and top structures 60 to one another, and to the handle neck portion 42.

The top installation head structure 60 is generally defined by a substantially flat lower surface 62, which, when abutted and secured against first upper surface 53 of bottom structure 60, provides for the cooperative formation with slot-defining recess 52 of the pin-receiving slot 34. The lower surface 62 further rests substantially flush against the slotted handle neck portion 42, itself nested against the bottom structure's second upper surface 55. A pair of recessed fastening holes 67 and 68 is also provided for allowing insertion of fasteners 70 and 72 therethrough for engagement with fastening holes 57 and 58 of bottom structure 50, while allowing the head of the fasteners 70 and 72 to sit flush with the upper surface 69 of the top structure 60. In this embodiment, the upper surface 69 is chamfered toward a pin-receiving end 64 of the top structure 60 so to facilitate entry of the apparatus 30 within a constrained work area.

In operation, the closed end 14 of the pin 10 is pushed into the slot 34 past the spring-loaded ball bearing 37 to be engaged thereby upon the ball bearing 37 returning under mechanical bias to its extracted position. The open end 12 of the pin 10, which now extends outwardly from the apparatus 30, can be advanced toward its intended destination using the apparatus 30. Grasping the handle 40, the open end 12 is engaged with a corresponding bracket (e.g. bracket 20 of FIG. 1). Upon proper engagement of the pin 10 with the bracket 20, retraction of the apparatus 30 will exert a longitudinal force on the pin 10 sufficient to disengage the closed end 14 of the pin 10 from the pin-retaining mechanism 36 with the slot 34. Namely, if the pin 10 is properly installed in the bracket 20, the locking engagement of the open end 12 with the bracket 20 will be stronger than the engagement of the closed end 14 with the pin-retaining mechanism 36 retaining the pin 10 in the slot 34. Otherwise, the pin will be retracted along with the apparatus 30, signaling inappropriate engagement of the pin's open end 12 with the bracket 20 and thus requiring reinstallation. Accordingly, the use of an apparatus 30 having a pin-retaining mechanism 36 as described herein, provides for an automatic check on pin installation adequacy.

Figure 8:
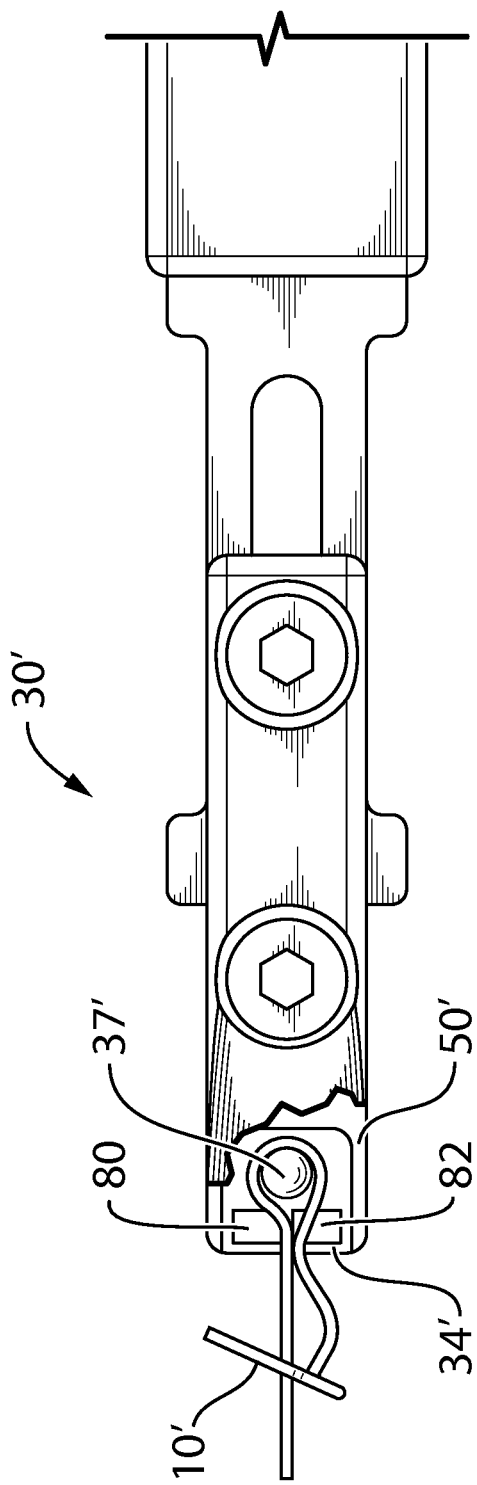
FIG. 8 is a top plan view of an apparatus for installing a transmission pin, partially cut away to show the pin retained therein by a pin-retaining mechanism, in accordance with another embodiment of the invention.

With reference to FIG. 8, and in accordance with another embodiment of the invention, a combined pin-retaining mechanism may be comprised of a resiliently-biased mechanism, such as spring-loaded ball bearing 37', and one or more magnets, such as magnetic disks 80, 82. In this particular embodiment, these magnets are embedded within bottom installation head structure 50' so to be positioned relative to the pin-receiving slot 34' in magnetically engaging the pin 10' once inserted therein. For example, in one such embodiment, such magnets may be used to enhance the pin-retaining capacity of the apparatus 30', whereby the magnetic retention force applied by the magnets 80, 82 on the pin 10' cooperates with the spring-loaded ball bearing 37', in increasing the longitudinal force required to extract the pin 10' from the apparatus 30'. It will be appreciated that other types of magnets, in different numbers and/or differently located, may also be considered within the context of this embodiment to provide a similar effect.

The above provides different examples of an apparatus for facilitating the proper installation of a looped pin or clip to an associated bracket, while allowing for the automatic identification of at least some improper pin installations that could otherwise have gone unnoticed. Other such examples are also intended to fall within the general scope of the present disclosure, as will be readily apparent to the person of ordinary skill in the art. For example, a similar apparatus may be designed to define other pin-receiving slot shapes and features amenable to different types of pins, and the like. For example, while a substantially rectangular slot is defined in the illustrative embodiments described herein, slots defined by a varying width or height, or again defined by curved, arcuate, grooved or otherwise textured inner surfaces may also be considered to accommodate different pin characteristics and facilitate proper guidance of the pin with the slot. The worker skilled in the art will also readily understand that while limiting the transverse or rotational motion of the pin within the slot through tight slot dimensioning may ultimately facilitate alignment and installation of the pin with its associated bracket, a tolerance on such motion may nonetheless vary depending on particular characteristics of the pin, associated bracket and their mutual engagement, without departing from the general scope and nature of the present disclosure.

Furthermore, while the above examples contemplate the provision of a spring-loaded ball bearing as a resiliently-biased pin-retaining mechanism, other mechanically biased structures may also be considered to provide a like effect, and that, without departing from the general scope and nature of the present disclosure. In some embodiment, the pin-retaining mechanism may further comprise one or more additional resiliently-biased mechanisms, for example where a particular pin structure is shaped or looped for engagement with more than one pin-retaining structure (e.g. two spring-loaded ball bearings engaging respective curved and/or looped segments of a given pin structure). As another example, two resiliently-biased pin-retaining mechanisms may extend into a same pin-receiving slot from different surfaces (e.g. top and bottom, top and side). Ultimately, the person of ordinary skill in the art will appreciate that the pin retaining mechanism may comprise different numbers, combinations, configurations and/or arrangements of a variety of resiliently biased structures based on the particular characteristics of the pin, and that such variations on the above-described illustrative embodiments are well within the scope of the present disclosure.

In the illustrated embodiments, the handle is secured via a neck portion fastened between top and bottom installation head structures. A similar apparatus may rather see the handle directly fastened to either structure, or again, integrally formed as a part thereof. Similarly, other means of securing the installation head structures to one another, and to the handle may be considered, such as nuts and bolts, rivets, various adhesives and the like, without departing from the general scope and nature of the present disclosure.

The apparatus disclosed herein can be constructed in different sizes and shapes to facilitate installation of different kinds of pins and clips such as the transmission pin described above. Furthermore, the pin-retaining mechanism can be designed to operate with force appropriate for the particular pin-bracket combination, for example by using spring-loaded ball bearings with the appropriate spring forces, or by using a combination of ball bearings and magnets, for example. As such, it can be adapted for the correct and easy installation of a variety of pins and clips in their associated brackets. Moreover, the effects of wear and tear can be minimized by the use of appropriately robust materials for the installation apparatus.

While the present disclosure describes various exemplary embodiments, the disclosure is not so limited. To the contrary, the disclosure is intended to cover various modifications and equivalent arrangements included within the spirit and scope of the appended claims. The scope of the following claims is to be accorded the broadest interpretation so as to encompass all such modifications and equivalent structures and functions.

While certain embodiments of the present invention are described in detail above, the scope of the invention is not to be considered limited by such disclosure, and modifications are possible without departing from the spirit of the invention as evidenced by the following claims:

What is claimed is:

1. An apparatus for installing a pin with loop-like structure and opposed open and closed end portions in an associated bracket, the apparatus comprising:
    a body having a pin-receiving slot formed therein for receiving the pin, the pin-receiving slot shaped and sized for longitudinal motion of the closed end portion therein with the open end portion extending outwardly therefrom; and
    a resiliently-biased pin-retaining mechanism transversely extending within the pin-receiving slot for releasably engaging and retaining the closed end portion within the pin-receiving slot during installation;
    wherein, upon engagement of the open end portion with the associated bracket, retraction of the apparatus releases engagement of the closed end portion with the pin-retaining mechanism, and
    wherein the pin-retaining mechanism comprises a spring-loaded ball bearing.

2. The apparatus of claim 1, further comprising a cavity formed in said body and extending transversely from within said slot for at least partially housing said resiliently-biased pin-retaining mechanism.

3. The apparatus of claim 1, further comprising a handle portion coupled to said body.

4. The apparatus of claim 3, wherein said handle extends longitudinally from said body.

5. An apparatus for installing a pin with loop-like structure and opposed open and closed end portions in an associated bracket, the apparatus comprising:
    a body having a pin-receiving slot formed therein for receiving the pin, the pin-receiving slot shaped and sized for longitudinal motion of the closed end portion therein with the open end portion extending outwardly therefrom; and
    a resiliently-biased pin-retaining mechanism transversely extending within the pin-receiving slot for releasably engaging and retaining the closed end portion within the pin-receiving slot during installation;
    wherein, upon engagement of the open end portion with the associated bracket, retraction of the apparatus releases engagement of the closed end portion with the pin-retaining mechanism;
    a handle portion coupled to the body, wherein the handle extends longitudinally from the body, wherein the handle comprises a neck portion, the body comprising a first and a second structure fastened to one another on either side of the neck portion for mechanical coupling thereto.

6. The apparatus of claim 5, wherein at least one of said first structure and said second structure has a recess formed therein which, upon coupling said first and second structures to one another, forms said pin-receiving slot.

7. The apparatus of claim 5, wherein said neck portion has a longitudinal slot formed therein for receiving at least one fastener therethrough in adjustably fastening said first and second structures along a length of said neck portion.

8. The apparatus of claim 5, wherein the apparatus further comprises one or more magnets for magnetic coupling with the pin when received within said slot to further retain the pin therein.

9. The apparatus of claim 5, wherein the pin comprises a loop portion at the closed end, said resiliently-biased pin-retaining mechanism shaped and sized to extend transversely through and thereby engage said loop portion when inserted into said pin-receiving slot.

10. The apparatus of claim 5, wherein said pin-retaining mechanism comprises a mechanically retractable structure biased in a deployed position that extends transversely within the pin-receiving slot for engagement with the closed end of the pin when inserted therein.

11. The apparatus of claim 5, wherein the pin is a transmission pin.

12. An apparatus for installing a in having opposed looped and locking end portions in an associated bracket, the apparatus comprising:
    a body having a pin-receiving slot formed therein for receiving the looped end of the in therein; and
    a resiliently-biased pin-retaining mechanism within the pin-receiving slot for releasably engaging and retaining the looped end portion within the pin-receiving slot during installation;
    wherein a resiliency of said pin-retaining mechanism is selected so as to release the looped end of the pin upon retraction of the apparatus once the pin has engaged the associated bracket, only upon the in lockingly engaging the associated bracket; and
    wherein said pin-retaining mechanism comprises a structure extending substantially transversely within said slot to releasably engage and retain the looped end of the pin therein.

13. The apparatus of claim 12, wherein said pin-retaining mechanism comprises a spring-loaded ball bearing.

14. The apparatus of claim 12, wherein the pin is a transmission pin.

* * * * *

UNITED STATES PATENT AND TRADEMARK OFFICE
CERTIFICATE OF CORRECTION

PATENT NO. : 9,242,358 B2
APPLICATION NO. : 13/370262
DATED : January 26, 2016
INVENTOR(S) : Benjamin B. MacArthur and Dennis Breedon It is certified that error appears in the above-identified patent and that said Letters Patent is hereby corrected as shown below:

Claims

Column 8, Claim 12:
Lines (29), (33), and (41) Please delete "in" and insert --pin--.

Signed and Sealed this
Twenty-sixth Day of April, 2016

Michelle K. Lee
*Director of the United States Patent and Trademark Office*